United States Patent [19]
Choi

[11] Patent Number: 5,448,601
[45] Date of Patent: Sep. 5, 1995

[54] ALGORITHM CONTROL METHOD FOR BLIND EQUALIZATION SYSTEMS

[75] Inventor: Yang-seok Choi, Suwon, Rep. of Korea

[73] Assignee: Samsung Electronics Co., Ltd., Kyungki, Rep. of Korea

[21] Appl. No.: 253,141

[22] Filed: Jun. 2, 1994

[30] Foreign Application Priority Data

Jun. 2, 1993 [KR] Rep. of Korea ............... 939868

[51] Int. Cl.$^6$ ............................................. H03H 7/30
[52] U.S. Cl. ............................... 375/232; 364/724.2
[58] Field of Search ............... 375/11, 14, 232, 230, 375/229; 364/724.19, 724.20; 333/18, 28 R

[56] References Cited

U.S. PATENT DOCUMENTS

| | | | |
|---|---|---|---|
| 5,119,401 | 6/1992 | Tsujimoto | 375/14 |
| 5,311,546 | 5/1994 | Paik et al. | 375/232 |

OTHER PUBLICATIONS

"Self-Recovering Equalization and Carrier Tracking in Two-Dimensional Data Comm. Systems" by D. N. Godard, IEEE on Comm. 1980 pp. 1867–1875.
"Theory on the Speed of Convergence in Adaptive Equalizers for Digital Comm." by G. Ungerboeck, IBM Res. Develop. pp. 546–555, 1972.
"Bussgang Techniques for Blind Equalization" by Sandra Bellini IEEE 1986, pp. 1634–1640.
"Blind Equalizers" by Albert Benveniste, IEEE 1984 pp. 871–883.

*Primary Examiner*—Stephen Chin
*Assistant Examiner*—Tesfaldet Bocure
*Attorney, Agent, or Firm*—Sughrue, Mion, Zinn, Macpeak & Seas

[57] ABSTRACT

A method for controlling algorithm conversion between the Godard algorithm and the decision-directed algorithm (DDA) is used in a blind equalization system for a digital communication receiver. The step size is varied while repeatedly performing the Godard algorithm. If a distance average value is smaller than a predetermined threshold value, the algorithm is converted into the DDA to calculate the equalization coefficient. If the distance average value is larger than another predetermined threshold value, the algorithm is converted into the Godard algorithm. Thus, the conversion between the Godard algorithm and the DDA and the step size alteration are adaptively performed according to a degree of convergency of the received signal, to obtain more quick and better equalization.

16 Claims, 3 Drawing Sheets

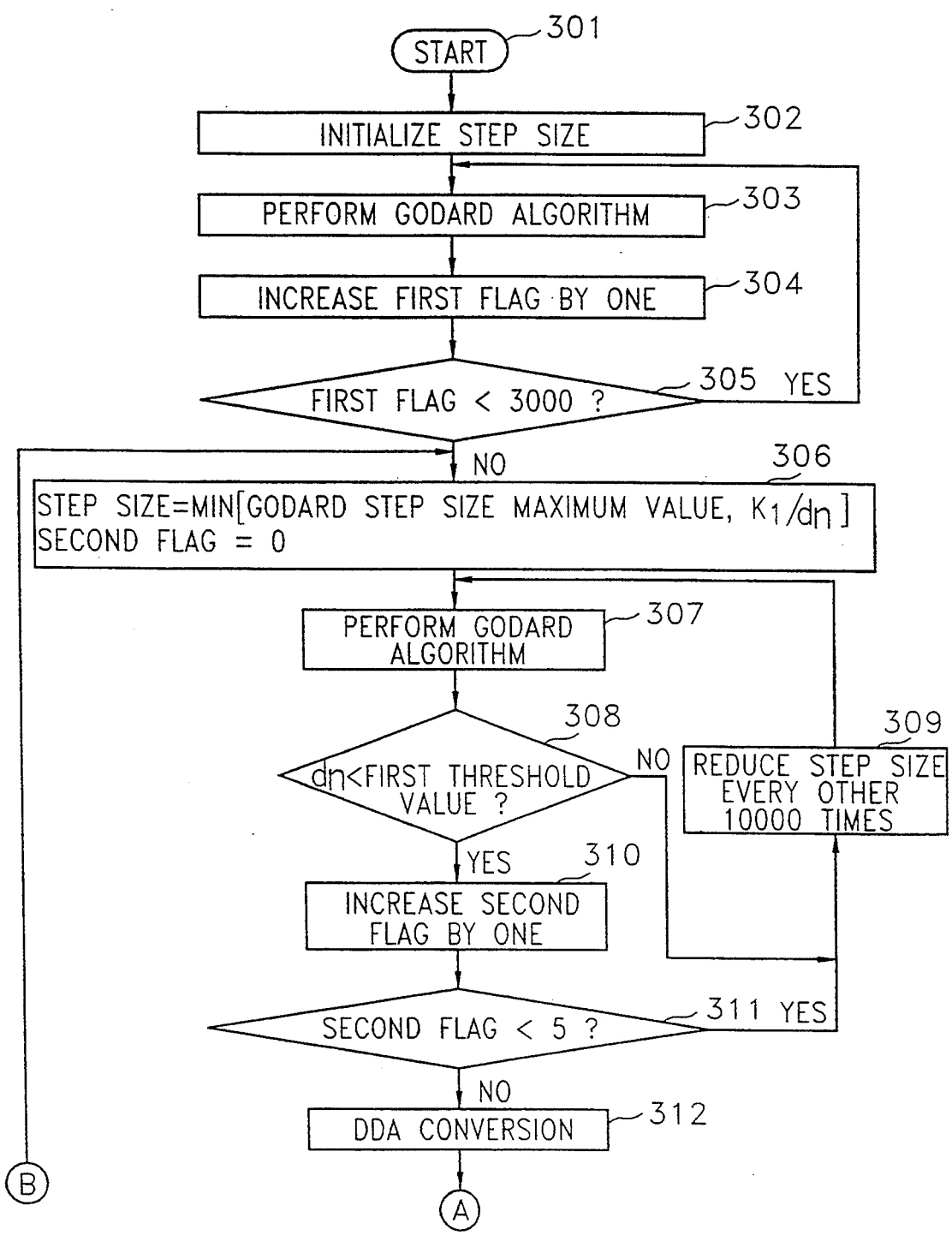

ALGORITHM CONTROL METHOD FOR BLIND EQUALIZATION SYSTEMS

BACKGROUND OF THE INVENTION

The present invention relates to signal equalization in a modem for use in a digital communication system, and, more particularly, to an algorithm control method for a blind equalizer.

In a digital communication system, a transmitter inserts a predetermined training sequence into a transmission signal at a certain interval, and transmits the inserted signal to a receiver. The receiver, on the other hand, detects and recognizes the training sequence, thereby discriminating a pattern of the transmitted signal to perform signal equalization. However, the transmitter may not transmit the transmission signal together with the training sequence. In this case, the receiver cannot recognize the pattern and state of the received signal. A method for receiving and equalizing the transmission signal which does not include the training sequence is called a blind equalization. An equalizer of such a blind equalization system is used in a voice band modem or a modem for digital communications such as a full digital high definition television, etc.

Algorithms used in the blind equalization process include a Godard algorithm, a stop-and-go algorithm (SGA), and a decision-directed algorithm (DDA), as examples. The Godard algorithm is discussed in the reference, "Self-recovering Equalizer and carrier Tracking in Two Dimensional Data Communication System" by D. N. Godard (IEEE Transactions on Communication, Volume COM-28, No. 11, pp. 1867–1875, November 1980).

FIG. 1 is a block diagram showing a general blind equalization system. Generally, since the DDA is not converged until the channel distortion of the received signal is removed to a degree, the initial employment of the DDA can cause the equalization to fail. Thus, the Godard algorithm which can obtain excellent convergency even if the channel distortion is severe should be firstly executed and then a fine equalization should be executed with the DDA. In the blind equalization system, a Godard algorithm execution circuit 13 performs equalization using the Godard algorithm with respect to the applied unequalized signal $Y_n$. When the number of signal equalizations using the Godard algorithm reaches a predetermined number, the blind equalization system controls a DDA execution circuit 14 to perform the signal equalization. Since then, the applied signal $Y_n$ is minutely equalized by the DDA of the DDA execution circuit 14, the SGA, or a modified SGA. In this manner, a coefficient $C_n$ which is obtained by the Godard algorithm execution circuit 13 or DDA execution circuit 14 is used for updating tap-weights of the blind equalizer 11.

However, in the conventional blind equalization system, the Godard algorithm is used a predetermined number of times and is converted into the DDA. Accordingly, the equalization becomes worse. Also, since a step size of the equalization coefficient is uniquely applied in each algorithm, stable convergency of the equalizer cannot be easily obtained.

European Patent Laid-open Publication No. 0,524,559 A2 by Paik et al., published on Jan. 27, 1993, attempts to solve these problems. This reference discloses the use of a constant modulus algorithm (CMA) which is similar to the Godard algorithm to initialize the equalization coefficients. The DDA is performed when the phase error of the signal equalized by the equalization coefficients matches a predetermined threshold value. If the phase error does not match the threshold value while performing the DDA, the CMA is again performed.

SUMMARY OF THE INVENTION

The principal object of the present invention is to provide a compression algorithm control method in which conversion between a Godard algorithm and a DDA is adaptively performed in a blind equalization system according to a degree of the convergency of a received signal. The present invention also provides an algorithm control method for a blind equalization system capable of adaptively varying a step size of an equalization coefficient.

To accomplish the above and other objects of the present invention, there is provided an algorithm control method for a blind equalization system in which a received data signal for a digital communication system is blind-equalized according to an equalization coefficient, which is generated by an equalization algorithm. The algorithm control method includes the steps of: a) initializing a first step size into a predetermined value, b) executing, a predetermined number of times, a first algorithm which is capable of removing channel distortion according to the first step size irrespective of phase error, to thereby perform initial equalization, c) altering the first step size using an error value corresponding to initially equalized first algorithm, d) executing the first algorithm according to the altered first step size and adaptively varying the first step size, to thereby perform first adaptive equalization, e) comparing a first conversion decision variable value which is obtained in step d) with a first reference value in size, f) converting an algorithm for generating the equalization coefficient according to the comparison result of step e) into a second algorithm, g) altering a second step size by executing the second algorithm and using the error value according to the execution of the second algorithm, h) executing the second algorithm according to the altered second step size and adaptively varying the second step size, to thereby perform second adaptive equalization, i) comparing a second conversion decision variable value which is obtained in step h) with a second reference value in size, and j) converting an algorithm for generating the equalization coefficient according to the comparison result of step i) into the first algorithm.

BRIEF DESCRIPTION OF THE DRAWINGS

FIGS. 3A and 3B are flowcharts of an algorithm control method in a blind equalization system according to the present invention.

DETAILED DESCRIPTION OF THE PREFERRED EMBODIMENT

A preferred embodiment of the present invention will be described below in more detail with reference to the accompanying drawings.

Figure 1:
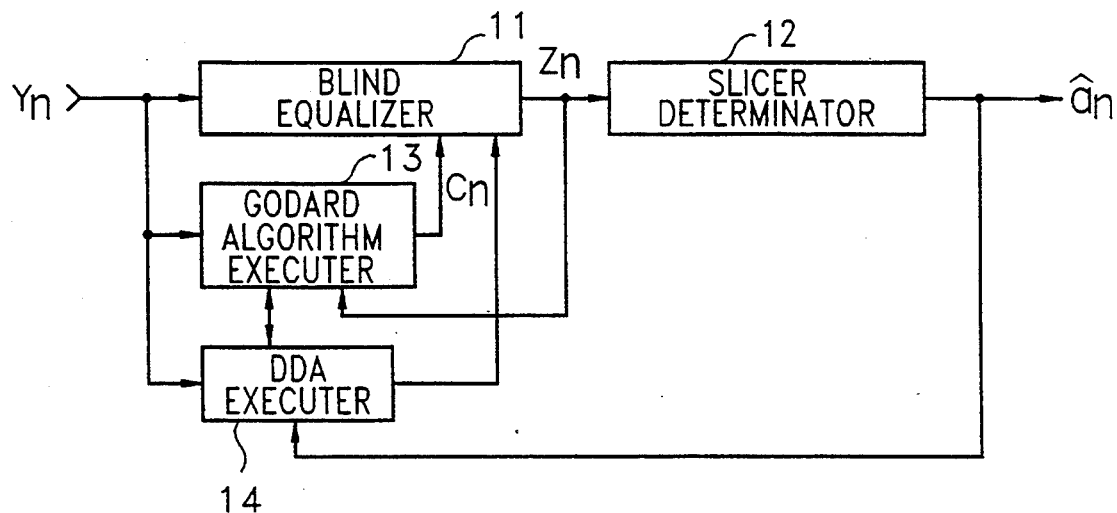
FIG. 1 is a block diagram showing a general blind equalization system, which is equally useful in understanding both a conventional blind equalization system and a blind equalization system according to the present invention.

The present invention uses an average value of a distance between a received signal and a decision point. The distance average value is identical to an average value of the decision-directed error, and is used for conversion between the algorithms. Here, the received signal is an input signal $Y_n$ which is applied to the blind equalization system. The decision point is data $â_n$ which is finally decided and output from decision circuitry 12. The received signal $Y_n$ and decision data $â_n$ are shown in FIG. 1. The distance average value $d_n$ is defined by the following equation (1) which is based on a distance value $ê_n$ between the equalizer output signal $Z_n$ and the decision point.

$$d_n = (1/N) \cdot \sum_{i=n-N+1}^{i=n} |ê_i| \quad (1)$$

Distance value $ê_n$ is defined by the following equation (2).

$$ê_n = ê_{n,R} + jê_{n,I} \quad (2)$$

Here, $ê_{n,R}$ and $ê_{n,I}$ represent a real portion and an imaginary portion of the distance value $ê_n$, respectively, and are defined by the following equation (3).

$$\left. \begin{array}{l} ê_{n,R} = Z_{n,R} - â_{n,R} \\ ê_{n,I} = Z_{n,I} - â_{n,I} \end{array} \right\} \quad (3)$$

Here, $Z_n$ constitutes output data of the blind equalizer of FIG. 1, and $â_n$ is data of the point which is finally decided on constellation by the decision circuitry 12. Therefore, the distance value $ê_n$ can be obtained by calculation using equalization (3), or by using a ROM table having variables for $Z_n$ and $a_n$. The distance average Value $d_n$ can be obtained by using a transversal filter, which requires a considerable amount of cost in realization of the hardware. The present invention uses a circular buffer memory as shown in FIG. 2 or a first-in-first-out memory to embody the distance average value $d_n$ at a relatively low cost.

Figure 2:
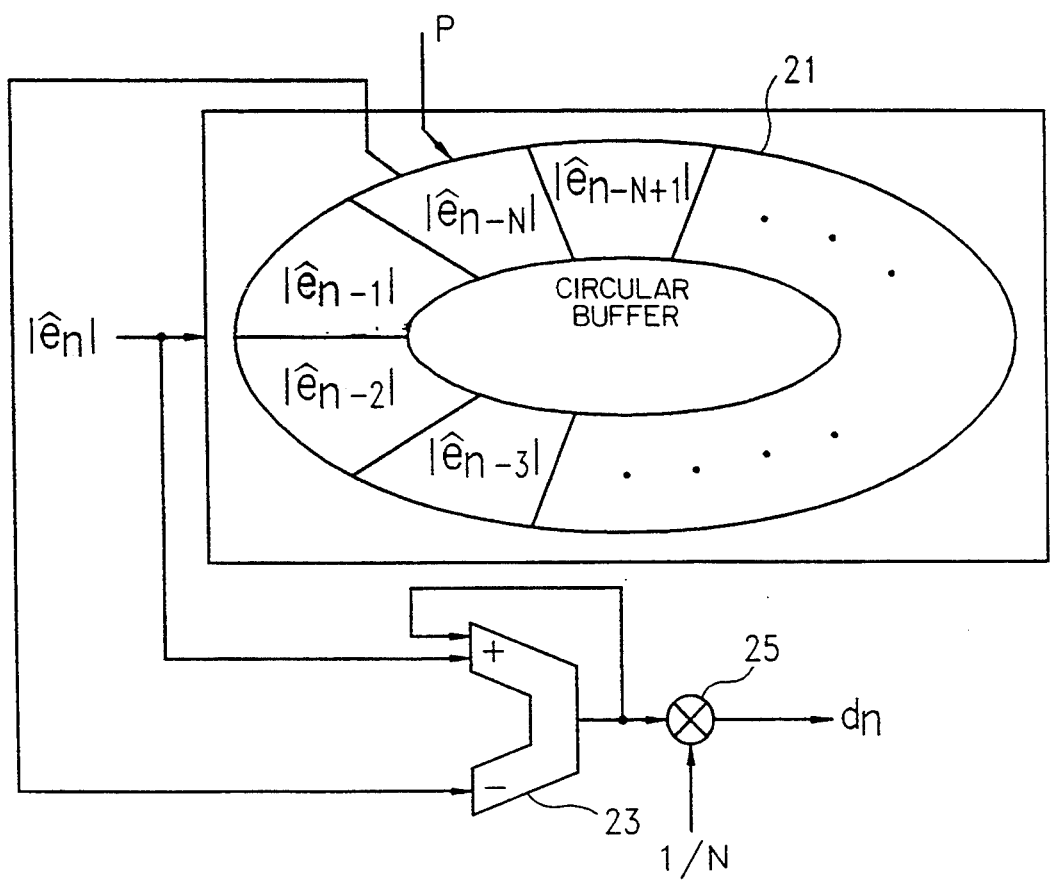
FIG. 2 is a conceptual diagram illustrating a calculation method of a distance average value.

FIG. 2 is a conceptual diagram illustrating a method of calculation of the distance average value. In FIG. 2, a circular buffer 21 stores absolute values of N distance values ($|ê_{n-1}|, |ê_{n-2}|, \ldots, |ê_{n-N}|$). Here, pointer P points to a position where the first input distance value $|ê_{n-N}|$ has been stored. When a new distance value $|ê_n|$ is input in the FIG. 2 apparatus, the circular buffer 21 outputs the first input distance value $|ê_{n-N}|$ among the distance value of the position which is indicated by the pointer P (i.e., the data currently stored in the circular buffer 21) to an accumulator 23. The accumulator 23 subtracts the distance value $|ê_{n-N}|$ from the distance accumulated value $N \cdot d_n$, which is fedback to its own adding port. The accumulator 23 also adds the newly input distance value $|ê_n|$ to the distance accumulated value $N \cdot d_n$, which is obtained by subtracting distance value $|ê_{n-N}|$ from distance value $|ê_n|$.

On the other hand, the newly input distance value $|ê_n|$ is stored in a position of the circular buffer 21 which is currently indicated by the pointer P, that is, a position where the value $|ê_{n-N}|$ has been stored. In addition, the indication position of the pointer P moves to a position where the first input distance value is stored among the data stored in the circular buffer 21. That is, the indication position of the pointer P moves from value $|ê_{n-N}|$ to $|ê_{n-N+1}|$ of the circular buffer 21. Accordingly, the data stored in the position of value $|ê_{n-N+1}|$ becomes the first input data among the data stored in the circular buffer 21. Also, the input order of N−1 distance values increases by one step. The data $N \cdot d_n$ output from the accumulator 23 is multiplied by $1/N$ in a multiplier 25. As a result, the multiplier 25 outputs the distance average value $d_n$. The equalization system shown in FIG. 1 uses thus-obtained distance average value $d_n$ and converts the algorithm for the signal equalization, into the Godard algorithm, and vice versa.

Figure 3B:
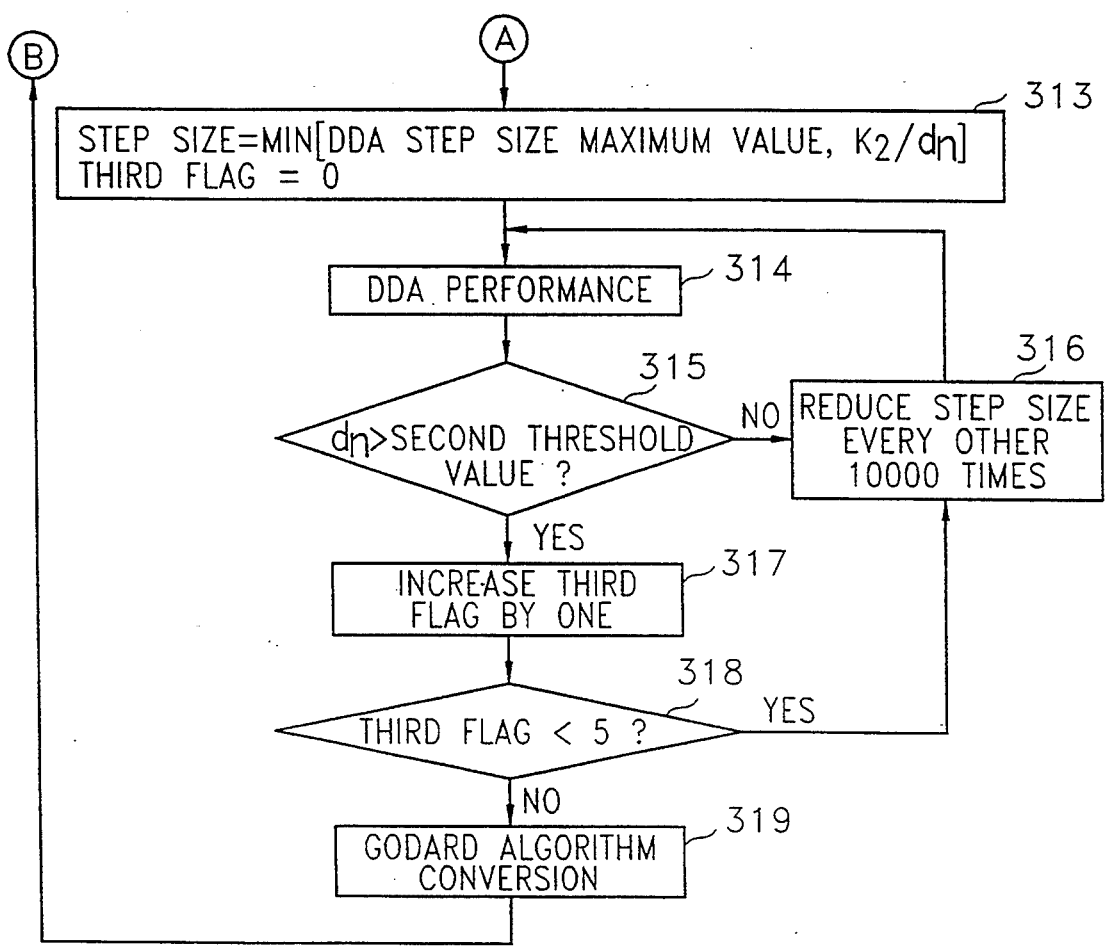

FIGS. 3A and 3B are flowchart diagrams of an algorithm control method in a blind equalization system according to the present invention.

The process begins with step 301 which turns the power on or alters the channel. After the system begins to operate, the step size is initialized (step 302). Here, an initialized value of the step size is experimentally determined according to the equalization system characteristics. The Godard algorithm is performed according to the initialized step size (step 303). A first flag is increased by one (step 304) following each iteration of the Godard algorithm. In step 305, a determination is made as to whether the first flag is smaller than 3,000 (step 305). Here, the first flag is the number of times by which the Godard algorithm is performed. The numerical number 3,000 which is used as a comparison reference value can be randomly determined according to the equalization system characteristics. If the flag is smaller than 3,000, the program returns to step 303 to perform the Godard algorithm again. On the other hand, if the first flag is not smaller than 3,000, that is, if the Godard algorithm is performed more than 3,000 times, the step size is altered. At the same time, a second flag is set to zero (step 306). Here, the step size is determined as a smaller value between the maximum value of the step sizes of the Godard algorithm that is experimentally determined for the stable convergence of equalization and $K_i/d_n$ ($K_1$ is a constant). Such a step size is varied by being inversely proportional to the distance average value $d_n$. However, the maximum value is set so as not to exceed the maximum value of the step size of the Godard algorithm. The Godard algorithm is performed according to the altered step size (step 307). Then, a determination is made as to whether the distance average value $d_n$ is smaller than a predetermined first threshold value (step 308). Here, the first threshold value is a threshold value for determining conversion of the Godard algorithm into the DDA or the SGA, and is experimentally determined according to the system characteristics. If the distance average value $d_n$ is not smaller than the first threshold value, the step size is fedback and is decreased at step 309; the step size is decreased whenever the number of iterations the Godard algorithm is performed (at step 307) reaches a predetermined number of times. In the FIG. 3 embodiment, a reference number of times for decreasing the step size is set to 10,000 (for example). This value can be set optionally according to the system characteristics. Also, the step size of step 309 can be set as an optional size according to the hardware characteristics of the system.

On the other hand, if the distance average value $d_n$ is smaller than the first threshold value, the second value is increased by one (step 310). Then, it is checked whether the second flag is smaller than five (step 311). The value of the second flag is a variable for determining the sensitivity of the algorithm conversion, which is experimentally determined according to the system characteristics. Step 311 is for preventing the algorithm conversion of the Godard algorithm into the DDA from being excessively sensitive with respect to noise. If the second flag is smaller than five, the Godard algorithm of step 307 is again performed. In this case, the step size is also decreased at step 309 whenever the feedback number of times is a predetermined number of times. On the other hand, if the second flag is not smaller than five, the Godard algorithm is converted into the DDA (step 312).

The algorithm which is used for determining the equalization coefficient is converted into the DDA; the step size is again altered (step 312). At step 313, the step size is determined as a smaller value between the maximum value among the DDA step sizes that is experimentally determined for the stable convergence of equalization and $K_2/d_n$ ($K_2$ is a constant). Such a step size is varied by being inversely proportional to a distance average value $d_n$. However, the maximum value is set so as not to exceed the maximum value of the step size of the DDA. Also, a third flag is set to zero. Thereafter, the DDA is performed according to the altered step size (step 314). Then, it is checked whether distance average value $d_n$ which is involved with the DDA execution is larger than a second threshold value (step 315). Here, the second threshold value is a threshold value for being converted into the Godard algorithm from the DDA, and is experimentally determined according to the system. If the distance average value $d_n$ is not larger than the second threshold value, the DDA of the previous step 314 is performed. The step size is decreased at step 316 whenever the feedback number of times equals 10,000. Here, the feedback number of times, 10,000, can be optionally set according to the system characteristics.

On the other hand, if the distance average value $d_n$ is larger than the second threshold value, the third value is increased by one (step 317). Then, it is checked whether the third flag is smaller than five (step 318). When the system algorithm is converted into the DDA from the Godard algorithm, step 318 will prevent the algorithm from being excessively sensitively performed. Thus, a comparison reference value of the third flag is a reference value for determining sensitivity of the algorithm conversion, in a similar manner to that of the second flag, which is experimentally determined according to the system characteristics. If the third flag is smaller than five, the DDA of step 314 is again performed. In this case, the step size is decreased at step 316 whenever the feedback number of times equals 10,000. On the other hand, if the third flag is not smaller than five, the DDA is converted into the Godard algorithm (step 319), and fedback to step 306.

As described above, in the algorithm control method for the equalization system according to the present invention, a distance average value $d_n$ is obtained and compared with a predetermined threshold value, to convert the Godard algorithm into the DDA or the DDA into the Godard algorithm to perform conversion of the system algorithm. Here, the respective step sizes are varied according to the number of times by which the Godard algorithm or the DDA is performed. The thus-obtained distance average value is repeatedly compared with the threshold value. By doing so, the algorithm conversion is adaptively performed according to a degree of the convergency of the received signal. Accordingly, the received signal is equalized more quickly and better.

What is claimed is:

1. An algorithm control method for a blind equalization system in which a received data signal in a digital communication system is blind-equalized according to an equalization algorithm using an equalization coefficient, said algorithm control method comprising the steps of:
   a) initializing a first step size into a predetermined value;
   b) executing, a predetermined number of times, a first algorithm for removing channel distortion according to the first step size irrespective of any phase error, to thereby perform initial equalization;
   c) altering the first step size using an error value corresponding to the initially equalized first algorithm;
   d) executing the first algorithm according to the altered first step size and adaptively varying the first step size, to thereby perform first adaptive equalization, and generating a first conversion decision variable value;
   e) comparing said first conversion decision variable value obtained in the step d) with a first reference value;
   f) converting the first algorithm for generating the equalization coefficient according to a respective comparison result of the step e) into a second algorithm;
   g) altering a second step size by executing the second algorithm and using the error value according to the execution of the second algorithm;
   h) executing the second algorithm according to the altered second step size and adaptively varying the second step size, to thereby perform second adaptive equalization, and generating a second conversion decision variable value;
   i) comparing said second conversion decision variable value obtained in the step h) with a second reference value in size; and
   j) replacing the second algorithm for generating the equalization coefficient according to a respective comparison result of the step i) into the first algorithm.

2. An algorithm control method for a blind equalization system according to claim 1, wherein said step b) comprises the steps of:
   b1) preforming the first algorithm;
   b2) comparing the number of times by which the first algorithm is performed with a third reference value; and
   b3) completing the execution of the first algorithm using the initialized step size according to the comparison result of said step b2).

3. An algorithm control method for a blind equalization system according to claim 2, wherein said step c) comprises the step of determining the first step size as a smaller value among a value which is inversely proportional to the error value and the maximum value of the step size of the first algorithm.

4. An algorithm control method for a blind equalization system according to claim 3, wherein said step d) comprises the steps of:
   d1) comparing the error value corresponding to the first algorithm with the first threshold value;
   d2) reducing the first step size according to the number of times by which the first algorithm is performed when the error value is smaller than the first threshold value in said step d1); and d3) performing the first algorithm using the reduced first step size.

5. An algorithm control method for a blind equalization system according to claim 4, wherein said step e) comprises the steps of:

e1) increasing the first conversion decision variable value by a predetermined amount when the error value is larger than or equaled to the first threshold value in the result of said step d1; );

e2) comparing the increased first conversion decision variable value with the first reference value; and e3) performing steps following step d2) when the first conversion decision variable value is smaller than the first reference value in the result of said step e2).

6. An algorithm control method for a blind equalization system according to claim 5, wherein said step f) comprises the step of selecting the second algorithm when the first conversion decision variable value is larger than or equaled to the first reference value in the result of said step e2).

7. An algorithm control method for a blind equalization system according to claim 6, wherein said step g) compares the step of determining the second step size as a smaller value among a value which is inversely proportional to the error value and the maximum value of the step size of the second algorithm.

8. An algorithm control method for a blind equalization system according to claim 6, wherein said step h) comprises the steps of:

h1) comparing the error value corresponding to the second algorithm with the second threshold value;

h2) reducing the second step size according to the number of times by which the second algorithm is performed when the error value is smaller than the second threshold value; and h3) performing the second algorithm using the reduced second step size.

9. An algorithm control method for a blind equalization system according to claim 8, wherein said step i) comprises the steps of:

i1) increasing the second conversion decision variable value by a predetermined size when the error value is larger than or equaled to the second threshold value in the result of said step h1);

i2) comparing the increased second conversion decision variable value with the second reference value; and i3) performing steps following step h2) when the second conversion decision variable value is smaller than the second reference value in the result of said step i2).

10. An algorithm control method for a blind equalization system according to claim 9, wherein said step j) selects the first algorithm when the first conversion decision variable value is larger than or equaled to the second reference value in the result of said step i2).

11. An algorithm control method for a blind equalization system according to claim 10, wherein said first algorithm is the Godard algorithm.

12. An algorithm control method for a blind equalization system according to claim 11, wherein said second algorithm is the decision-directed algorithm.

13. An algorithm control method for a blind equalization system according to claim 12, wherein said conversion decision variable value is a variable for determining sensitivity of the algorithm conversion.

14. An algorithm control method for a blind equalization system according to claim 1, wherein said error value is a distance average value ($d_n$) which is obtained by calculation in accordance with the following equation using a distance value ($\hat{e}_n$) between the equalized signal and a decision point corresponding to the equalized signal on constellation:

$$d_n = (1/N) \cdot \sum_{i=n-N+1}^{i=n} |\hat{e}_i|.$$

15. An algorithm control method for a blind equalization system in which a received data signal in a digital communication system is blind-equalized according to a selected one of a plurality of equalization algorithms using respective equalization coefficients, said algorithm control method comprising the steps of:

a) initializing a first step size into a predetermined value;

b) repeatedly performing a first algorithm a predetermined number of times for removing channel distortion according to said first step size irrespective of any phase error, to thereby perform initial equalization;

c) altering said first step size according to an error value generated responsive to the initially equalized first algorithm;

d) repeatedly performing said first algorithm using the altered first step size and adaptively varying said first step size, to thereby perform first adaptive equalization;

e) generating a first conversion decision variable value;

f) comparing said first conversion decision variable value obtained in the step e) with a first reference value to thereby generate a first comparison result;

g) selectively employing a second algorithm and discontinuing use of said first algorithm for generating the equalization coefficient responsive to said first comparison result;

h) altering a second step size by executing the second algorithm and using the error value according to the execution of the second algorithm;

i) executing said second algorithm according to the altered second step size and adaptively varying said second step size, to thereby perform second adaptive equalization;

j) generating a second conversion decision variable value;

k) comparing said second conversion decision variable value obtained in the step j) with a second reference value in size to thereby generate a second comparison result; and l) selectively employing said first algorithm and discontinuing use of said second algorithm for generating the equalization coefficient responsive to said second comparison result.

16. The algorithm control method for a blind equalization system according to claim 1, wherein said error value is a distance average value ($d_n$) which is obtained by calculation in accordance with the following equation using a distance value ($\hat{e}_n$) between the equalized signal and a decision point corresponding to the equalized signal on constellation:

$$d_n = (1/N) \cdot \sum_{i=n-N+1}^{i=n} |\hat{e}_i|.$$

* * * * *